May 19, 1970   T. A. PASCOE   3,513,385
METHOD AND APPARATUS FOR ANALYZING THE FREQUENCY
Vs. PHASE CHARACTERISTIC OF AN ELECTRIC SYSTEM
Filed March 24, 1966                                   5 Sheets-Sheet 1

INVENTOR.
THOMAS A. PASCOE
BY
AGENT

INVENTOR.
THOMAS A. PASCOE
BY
AGENT

United States Patent Office 3,513,385
Patented May 19, 1970

3,513,385
METHOD AND APPARATUS FOR ANALYZING THE FREQUENCY VS. PHASE CHARACTERISTIC OF AN ELECTRIC SYSTEM
Thomas Albert Pascoe, Clovelly Park, South Australia, Australia, assignor, by mesne assignments, to U.S. Philips Corporation, New York, N.Y., a corporation of Delaware
Filed Mar. 24, 1966, Ser. No. 537,192
Int. Cl. G01r 23/00, 27/00
U.S. Cl. 324—57
13 Claims

ABSTRACT OF THE DISCLOSURE

A method and apparatus for analyzing the frequency vs. phase characteristic of an electric system. The apparatus includes means for generating first and second signals that sweep linearly in opposite directions over a given frequency band. The first signal is applied to the system under test. The output signal from the system under test and the second signal are applied to a balanced modulator that produces a signal that fluctuates about a frequency proportional to the sum frequency of the first and second signals. The signal from the modulator is applied to a frequency detector that produces a signal that varies in accordance with the frequency fluctuations during the sweep of said first and second signals.

---

The primary object of this invention is to provide new and improved methods and apparatus for studying the dynamic behaviour of electronic circuits.

The performance of electronic circuits, particularly those employed in the fields of telecommunications, radio, television and professional equipment, can be precisely assessed if the frequency-amplitude and frequency-phase characteristics under normal operating conditions and loads are known. There are simple, well known and commonly employed techniques for displaying the frequency-amplitude response of a circuit in a swept manner on the screen of a cathode ray oscilloscope. However, to the applicant's knowledge, a similar practical technique for displaying the frequency-phase response, particularly the group delay, has not been developed hitherto. Consequently, approximate and indirect techniques, such as the pulse and bar generator in television receiver testing, have been employed for this purpose where elaborate point by point plotting cannot be justified or the necessary equipment is not available.

This is therefore one sphere in which the present invention can find useful application, particularly because the proposed method lends itself to a swept oscilloscope display of the group delay characteristic of a circuit under test, although the use of such a display is not essential for the purposes of this invention.

Basically, the present invention provides a method of ascertaining the frequency-phase characteristic of a circuit over a given frequency bandwidth. The method involves the steps of generating a first signal having a frequency which sweeps in a time-linear manner in one direction over the bandwidth concerned, generating a second signal which sweeps in a time-linear manner in the opposite direction over the frequency band, applying the first signal to the circuit to be tested, combining the output from the circuit under test with the second signal so as to select a component of the combination which has a substantially constant frequency that is equal or proportional to the instantaneous sum frequency of the first and second signals, and detecting or indicating the frequency variation in said component during each sweep of the first and second signal frequencies.

Since many circuits which have to be tested in this way include detectors, mixers and frequency converters and are designed to demodulate radio frequency signals, and since the group delay characteristic is a useful indication of the phase characteristics of such circuits, another feature of the present invention is that the aforesaid first swept signal can be employed to modulate a radio frequency or other signal appropriate to the circuit being tested. The modulated signal is applied to the circuit and the demodulated signal from the circuit is combined with the second swept signal as before, but the fluctuation in the constant frequency component represents the combination of the group delay of the HF stages and the phase delay of the LF stages.

Preferably, though not essentially, the output from the circuit under test and the second swept signal are combined by applying them, after suitable amplification and limiting, to the two inputs of a balanced modulator of the type employed for suppressed carrier modulation, for example. The swept signal components in the output of the balanced modulator can then be further attenuated with respect to the constant frequency component by passing the output of the modulator through a narrow band filter. The fluctuations in the frequency or phase of this substantially constant frequency component are thus indicative of the frequency-phase characteristics of the circuit and can be detected by a frequency discriminator or detector so that they can be displayed against the sweep signal on an oscilloscope. Alternatively, the output of the narrow band filter can be fed to a frequency meter that is adapted to sample the aforesaid signal component at a predetermined point in the sweep of the two input signals.

Since the phase characteristics exhibited by many circuits consist of a relatively large constant delay component and a relatively small variable delay component, the frequency or phase fluctuations to be detected and displayed are often only a small percentage of the frequency shift from the nominal frequency of the aforesaid signal component. In order to emphasize the variable delay component of the phase characteristic while taking into account the relatively large fixed value delay component, a calibrated delay line can be inserted in the second swept signal path according to a preferred but nonessential feature of the present invention. The delay line provides a means of off-setting the delay to a measured degree. Furthermore, according to another optional but advantageous feature, a novel form of phase comparator with controllable sensitivity can be employed to convert the frequency or phase fluctations into amplitude fluctuations to facilitate oscilloscope display. Finally, the display or measurement can be continuously calibrated according to yet another optional feature of the present invention whereby a calibrating signal is switched in during the retrace time of the sweep signal.

It is to be understood that the present invention pertains both to the method of measurement outlined above and to any apparatus required by or implicit in this method. It is, of course, not necessary for the particular circuit under test to form part of the apparatus of the present invention.

Basically, the frequency detector of this invention compares the incoming signal with a reference signal by means of a phase comparator, for example, of the ratio detector or Foster-Seeley type. The reference signal is generated by a variable frequency oscillator controlled, at least in part, by the output of the phase comparator. The arrangement may be such that the difference between the nominal frequency of the incoming signal and the reference signal is automatically controlled. Preferably, but not essentially, the output of the detector or discriminator is applied across a series-connected potentiometer and capacitor and the wiper of the potentiometer is connected to a frequency control circuit associated with the reference frequency oscillator. In this way, the response time of the feed-back loop can be controlled to regulate the sensitivity of the discriminator to frequency fluctuations in the incoming signal.

In order to further portray the nature of the present invention, one particular form of test apparatus for a particular class of electronic circuits will now be described by way of example and illustration only. The particular apparatus chosen is a test instrument for measuring and displaying in a swept manner the group delay of the whole of the R.F. and I.F. stages and if desired, of the video frequency stages of television receivers. These stages therefore form the electronic circuits referred to above. In the following description reference will be made to the accompanying drawings in which:

The usual method of assessing the group delay characteristic of a complete television receiver is to study its transient response behaviour by applying an accurately generated pulse and/or bar modulated television signal to the receiver and assessing the distortions which the total receiver adds to the original waveform. The difficulty of assuring that the test waveform is generated with the required precision and of knowing which portions of the receiver contribute which distortions makes this a reliable method only when used by highly skilled and experienced technicians. Now, by the application of the principles of the present invention, it is possible to display the total group delay characteristic of a television receiver on an oscilloscope in a swept manner. Furthermore, the present invention allows the group delay of individual sections of the receiver to be studied independently of one another and also provides an indication of the phase delay. The result is therefore a display which gives an objective and reliable indication of the phase characteristics of the receiver or portions thereof.

In this specification phase delay is understood to be the ratio of the change in phase produced by a given network to the frequency of the input signal applied to that network. The group delay at a given frequency is understood to be the slope or derivative of the phase characteristic at that frequency. Now, for a carrier wave modulated at a given modulating frequency, there is an effective phase shift of the modulating signal which gives rise to an equivalent modulation phase delay that is simply the ratio of this phase shift to the modulating frequency. It can be shown that, assuming the frequency-amplitude characteristic of the circuit concerned to be straight within the limited band of the modulating frequency, the modulation phase delay is equal to the group delay of the circuit. The overall phase characteristic of a circuit subjected to a modulated carrier wave is therefore the combination of the phase delay at the modulating frequency and the group delay at the carrier frequency. Finally, it will be noted that if there is to be no phase distortion, the phase delay must remain constant for all frequencies concerned. Therefore, the change in phase produced by the network must be directly proportional to frequency. This applies both for the normal phase delay and the modulation phase delay or group delay of the circuit.

Figure 1:
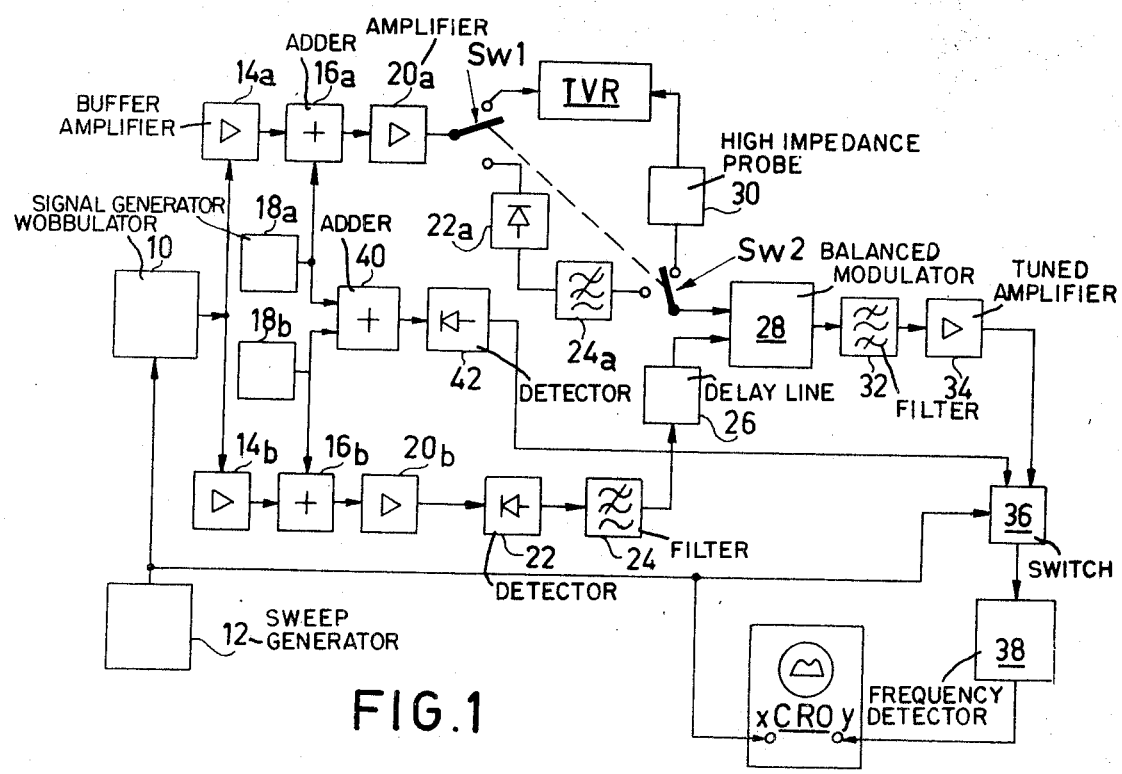
FIG. 1 is a block diagram representing the test arrangement of the particular embodiment including the receiver under test.

Bearing in mind the outline of the nature of the present invention and its preferred characteristics given earlier, reference will now be made to the block diagram of FIG. 1 of the drawings. For convenience of description it will be assumed that a television receiver TVR is to be tested on Channel 2, which has a bandwidth of 63 to 70 mc./s. and a picture carrier at 64.25 mc./s. Thus, it should be understood from the outset that the units of the instrument which generate or deliver frequencies appropriate to this channel can be switched to do the same for the other television channels.

Figure 2:
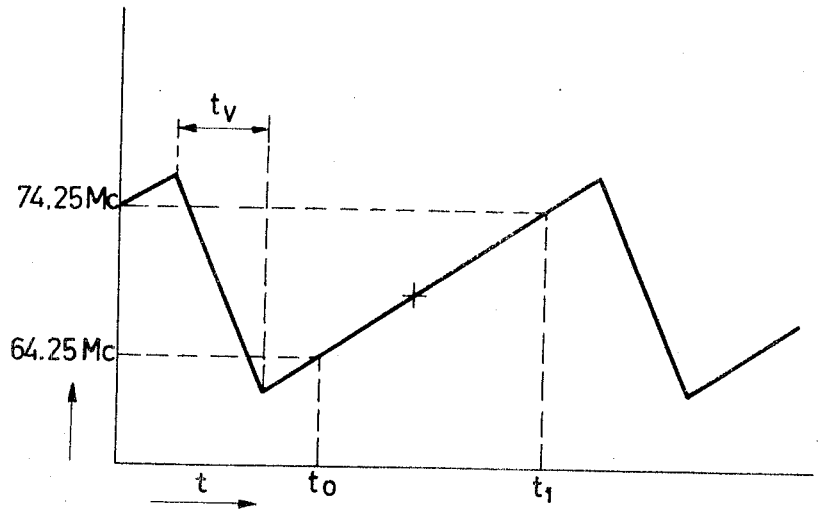
FIG. 2 is a graph illustrating the sawtooth sweep curve which causes the sweep of the input signals and provides the time base for the oscilloscope display.

The requisite oppositely sweeping first and second input signals are derived from a common wobbulator 10. The output of the wobbulator sweeps from 64.25 to 74.25 mc./s. in a time-linear fashion and is controlled by a sawtooth sweep signal supplied by a sweep generator 12. The waveform of generator 12 is shown in FIG. 2. The sweep frequency output of wobbulator 10 is applied to the inputs of two similar buffer amplifiers 14a and 14b in the first and second input signal circuits, respectively. The swept signal from buffer amplifier 14a is then combined in circuit 16a with a signal of 64.25 mc./s. derived from a signal generator 18a. The combination of the signals in circuit 16a, which may simply comprise a transformer coupling, is achieved substantially linearly and without the generation of intermodulation products. The combined output of circuit 16a is then applied via a buffer and variable amplifier 20a and switch SW1 to the R.F. input terminals of the television receiver TVR under test. In a precisely similar manner the output of buffer amplifier 14b is linearly combined in circuit 16b with a 74.25 mc./s. signal from generator 18b, and the combination is directed through a buffer and variable amplifier 20b.

The output of the amplifier 20b is applied to a high quality envelope detector 22. The output of detector 22 clearly includes a signal component which sweeps in a time linear manner from 10 mc./s. to zero cycles per second. The latter signal component is selected by a low-pass filter 24 and fed to a calibrated delay line 26 which can be switched to add predetermined constant phase delays to the swept signal. The output of the delay line 26 then is applied as the second swept input signal to the balanced modulator 28. The first swept input signal to the balanced modulator is detected by the video detector and obtained from the output of the video stage of receiver TVR via a high impedance probe 30 and switch SW2. The video detector of a television receiver is, of course, an envelope detector which functions in a manner similar to the detector 22 so that, assuming the receiver to have adequate frequency response, the first swept input signal applied to the balanced modulator 28 sweeps from 0 to 10 mc./s. Actually, it will sweep from 0 to about 5 mc./s. in practical receivers because of the limited band pass of the video stages. It may be noted that the video detector in receiver TVR under test operates in the presence of a video carrier as it would do if it were demodulating a normal television signal. This contributes to the accuracy of the instrument.

The output of the balanced modulator contains an emphasised signal component having a frequency of approximately 10 mc./s. This output is applied to a 10 mc./s. narrow band filter 32 which further attenuates all frequency components other than those close to 10 mc./s. After passing through a tuned amplifier and limiter circuit 34, the filtered 10 mc./s. signal is applied as one input to an electronic switch 36, and from there to the sensitive, 10 mc./s. narrow band frequency-detector 38. The other input signal to the electronic switch 36 is a 10 mc./s. calibrating signal obtained by combining the 64.25 mc./s. signal and the 74.25 mc./s. signal from generators 18a and 18b in the circuit 40 and detecting and filtering the combined signal in a detector and low-pass filter circuit 42. The switch 36 is driven by the output of the sweep generator 12 so that the inputs are alternately selected. The fluctuating 10 mc./s. signal from circuit 34 is selected during the forward sweep time of the sweep waveform and the calibrated 10 mc./s. signal from circuit 42 is selected during the retrace time of that signal. The sweep waveform from sweep generator 12 and the output of the frequency detector 38 are respectively applied to the X and Y terminals of a cathode ray oscilloscope CRO in order to obtain the desired display.

The apparatus can be checked by switching the receiver TVR out of the circuit and making the first and second signal paths substantially identical. This is done by switches SW1 and SW2 which connect the detector 22a and the low-pass filter 24a into the first signal path in place of the receiver. It may be preferable to include the high impedance probe 30 in the first input signal path and this can be readily achieved by switching SW1 only and then placing the probe at the output terminal of the filter 24a.

In order to obtain an adequately sensitive display on the cathode oscilloscope CRO, the sweep generator 12 generates the waveform shown in FIG. 2 at a frequency of 50 c./s. In the particular trace shown, the forward trace time between the intervals t0 and t1 is approximately 10 milliseconds, or half the cycle period, while the retrace time tr is much shorter. It will be noted that in FIG. 2 the co-ordinates of the sweep waveform can either be voltage and time or frequency and time if the output of the wobbulator is brought into consideration, the latter being the case in this figure.

At any instant of time during the sweep of wobbulator 10 it will be seen that there exist two frequency components in the balance modulator 28 which beat together to form a 10 mc./s. output component because of the time-linear and opposite sweeps of the two input signals. If each of the two input signals undergoes an equal and constant phase delay during the sweep, the output from the balanced modulator 28, which is applied to the frequency detector 38, will have a frequency of precisely 10 mc./s. On the other hand, if as can be expected, the first input signal which passes through the receiver TVR suffers a constant phase delay greater than that suffered by the second input signal, the beat signal produced in the balanced modulator is slightly lower in frequency than 10 mc./s. The constant phase delay produced by the receiver TVR will not usually be of much interest and therefore can be offset by means of the calibrated delay line 26 so that the beat frequency in the balanced modulator 28 is brought closer to 10 mc./s. However, what is of interest is the group delay introduced by the receiver circuitry which will result in a frequency dependent delay of the first signal. As a result, the output from the balanced modulator will be a signal frequency in the vicinity of 10 mc./s which has a phase modulation of a very small modulation index. It can be shown that the modulation index produced by a given group delay is proportional to the sweep rate, although the sweep rate is necessarily limited by the time constants in circuits such as the frequency.

Figure 3:
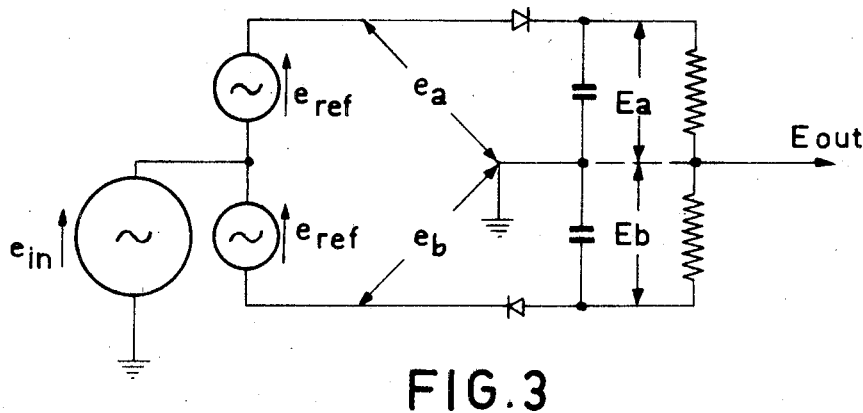
FIG. 3 is a schematic diagram to illustrate the principles of operation of the phase-comparator employed.

If it is assumed that a practical instrument of value in television work must be capable of measuring group delay to the nearest 10 nanoseconds with a maximum range up to approximately 1000 nanoseconds, it can be shown that the frequency detector of the instrument of this embodiment should have a sensitivity such that a departure of 10 c./s. from the mean frequency can be detached. Furthermore, the detector should have sufficient range to enable a departure of 1000 c./s. from the mean to be tolerated. The basic form of detector employed in this particular embodiment is shown in FIG. 3. The need for a special form of detector is obvious from the fact that a phase comparator can only register linearly if the phase difference between the reference and input signals is not greater than about 1 radian per second. The phase modulation of the 10 mc./s. signal from the balanced modulator in this embodiment obviously is much greater than this value. This is overcome according to the present invention by varying the reference frequency of the phase comparator in such a way that the phase difference between the incoming and reference signals always approximates this linear range. Thus, the detector of the present invention includes some form of control which enables the frequency of the reference signal to follow that of the incoming signal to a greater or lesser extent according to the modulation index of the incoming signal. The degree to which this control must be exerted is therefore a coarse measure of the group delay in the circuit under test.

Figure 3A:
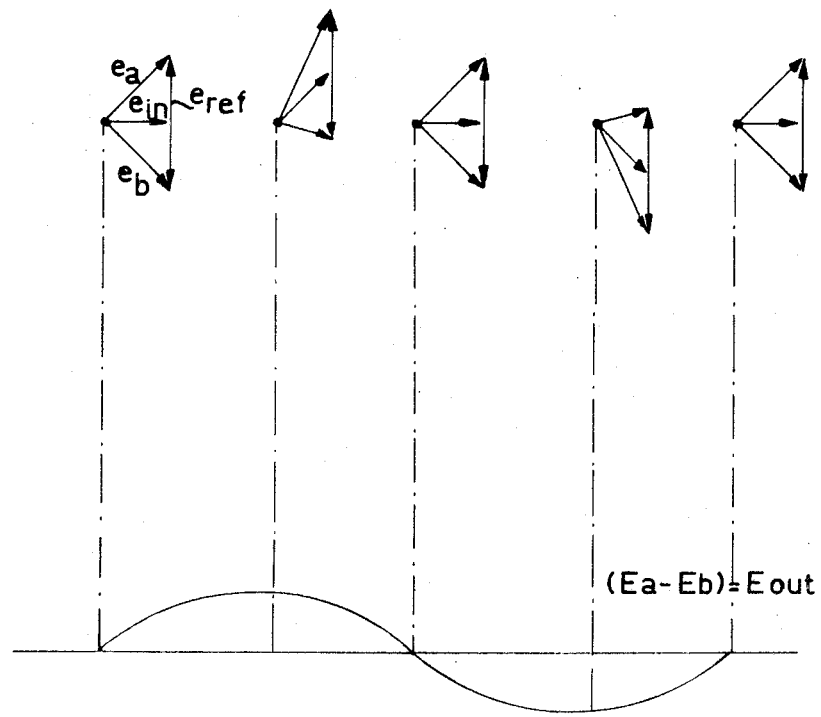
FIG. 3A is a collection of vector diagrams indicating the output of the phase-comparator for various input phase conditions.

It will be seen that the phase comparator of FIG. 3 is similar to a conventional ratio detector and the vector diagrams for various input phase conditions shown in FIG. 3A are also somewhat similar to those obtainable from a conventional ratio detector. However, in the conventional ratio detector used for F.M. demodulation, the reference signal is derived from the incoming signal by virtue of mutual coupling between a primary and a secondary circuit. This ensures firstly that the reference signal is in quadrature with the incoming signal and secondly that the phase modulation of the reference is slightly less than that of the incoming signal.

Figure 4:
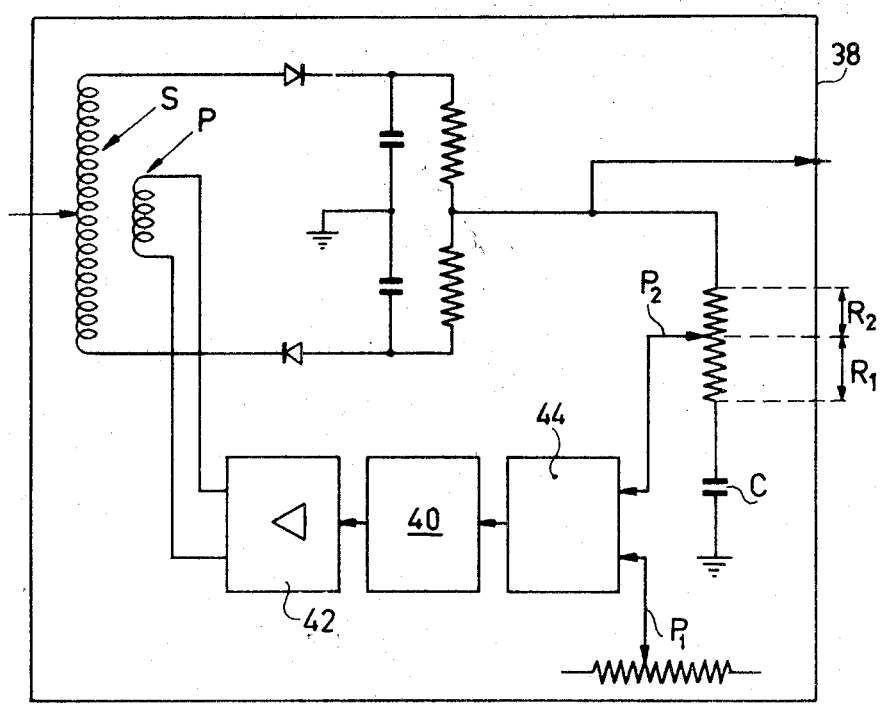
FIG. 4 is a block diagram of the frequency detector system employed in the present invention.
Figure 5:
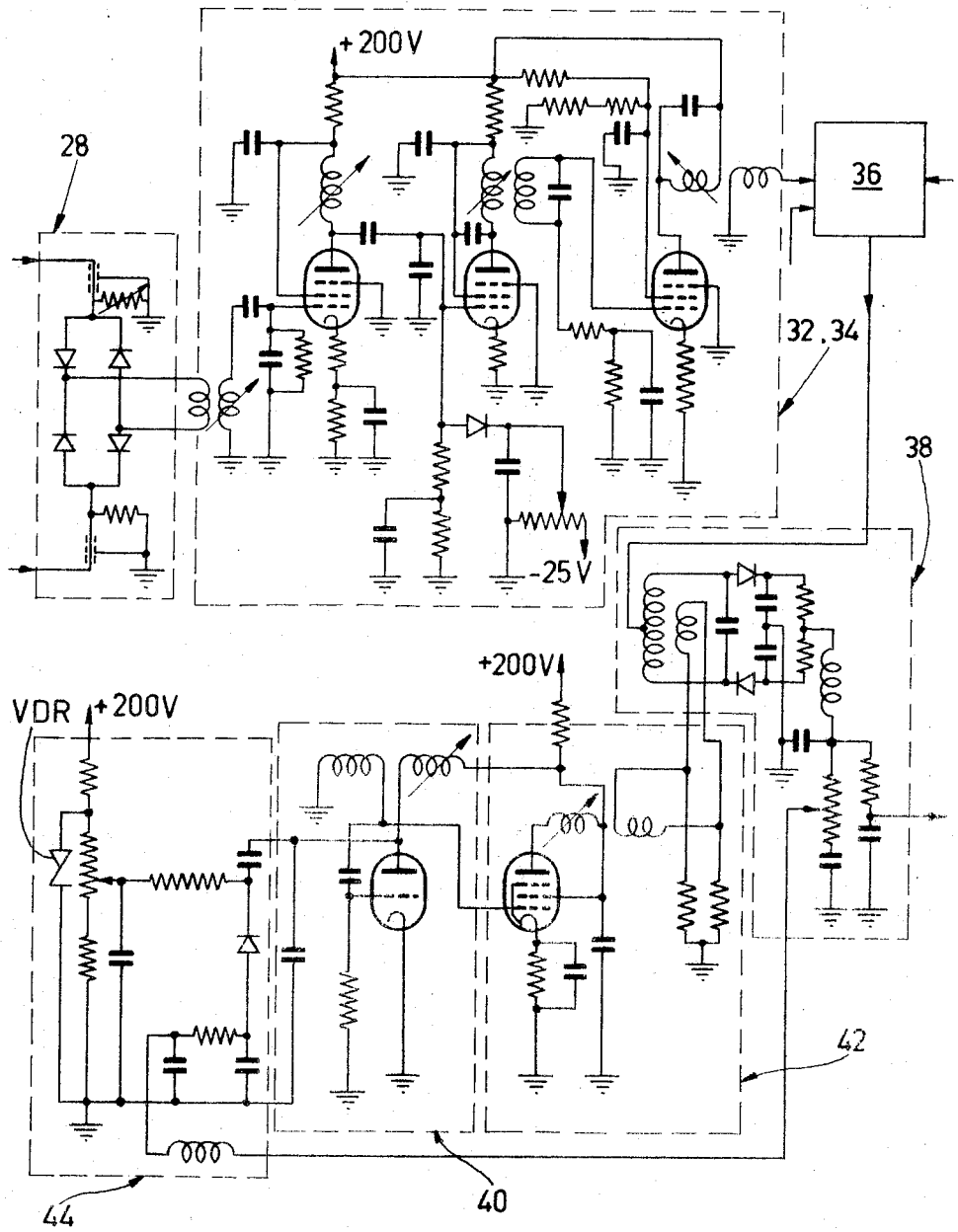
FIG. 5 is a detailed circuit diagram of a practical form which the balanced modulator and frequency detector system may take.

In the detector of the present invention, it will be seen from FIG. 4 that the reference signal is not derived by mutual coupling from the input signal but, rather, is injected into the "secondary" winding S of the detector by means of the closely coupled primary winding P which is energized from a 10 mc./s. reactance oscillator 40 via a buffer amplifier 42. The frequency of oscillator 40 is controlled by a reactance circuit 44 which, in turn, is controlled by two input signals. One of these signals is an over-riding reference oscillator frequency control schematically represented by the potentiometer P1. This signal serves to maintain the oscillator frequency at a nominal value of 10 mc./s., while the other input is derived from the demodulated output of the phase comparator via the potentiometer P2. The potentiometer P2 is connected between the output of the phase comparator and one side of a grounded capacitor C. It is apparent from FIG. 4 that for R1 maximum and R2 minimum, the oscillator 40 is forced to follow the phase variations of the input signal. On the other hand, if R2 is a maximum and R1 is a minimum and the time constant $(R1+R2)$ C is very much greater than the sweep time, then the reference oscillator follows none of the phase variations of the input signal. Obviously, therefore, an intermediate setting of the potentiometer P2 allows the oscillator 40 to follow the phase variations of the input signal with an intermediate fidelity. In other words, the oscillator 40 only follows variations in the phase of the input signal of relatively long period and will not follow short duration phase changes, which therefore appear in the output. The demarcation between the relatively long and relatively short phase changes is set by the potentiometer P2. A practical detailed circuit arrangement for the circuit units 28, 32, 34 and 38 is shown in FIG. 5 and is self explanatory.

The apparatus can, as previously stated, be easily adapted for investigating other circuits beside the combined R.F., I.F., and video networks of a television receiver. To illustrate some of these adaptions concisely, it will be assumed that the phase characteristics of the video network I.F. circuit, R.F. circuit and the I.F. and video networks of the receiver TVR are to be investigated separately. With the test apparatus as above described, this is most readily achieved by employing suitable accessory networks which can be inserted to replace those networks and circuits of the receiver which are not under consideration.

Figure 6:
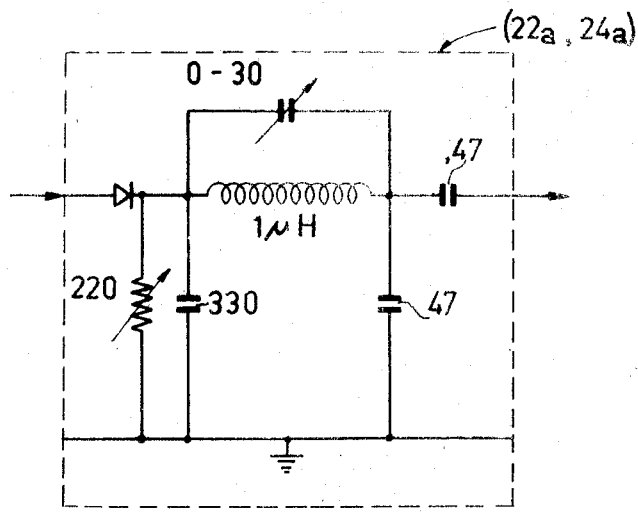
FIG. 6 is a detailed circuit diagram showing one practical form which the auxiliary detector and filter of FIG. 1 may take.

Thus, where the video network alone is to be tested, a phase linear detector and low pass filter can be substituted for the R.F. tuner, mixer I.F. amplifier and video detector of the receiver TVR. The output of the detector and filter then is applied to the input of the video network under test and the output of the video network is monitored as before with the high impedance probe and buffer 30. Thus, if the detector circuit 22a and the low pass filter 24a (see FIG. 1) are engaged by the switch SW1, the output from the low pass filter 24a can be supplied to receiver TVR at the output of its video detector. FIG. 6 shows a practical phase-linear network including a detector and low pass filter which can be used as the circuits 22a and 24a of FIG. 1. It is comparatively easy to obtain the phase-linear characteristic in such a circuit since frequency selectivity is no object.

Figure 7:
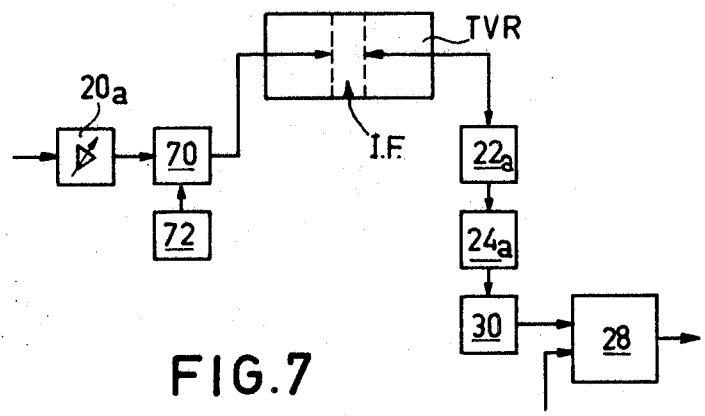
FIG. 7 shows, by means of a block diagram, how the apparatus incorporating the invention may be used to test only the I.F. circuit of a television receiver.

In order to test the I.F. circuits only, the arrangement of FIG. 7 could be used where the first swept signal is converted to the I.F. frequency. This is achieved by the use of a mixer and broad-band filter circuit 70 together with its associated local oscillator 72. The output of the I.F. circuit of the receiver TVR is detected and filtered in the previously mentioned circuits 22a and 24a before being passed to the balanced modulator 28 via the high impedance probe 30. Thus, the R.F. and mixer stages, as well as the video detector and video amplifier of the receiver, have been replaced by phase-linear circuits.

Figure 8:
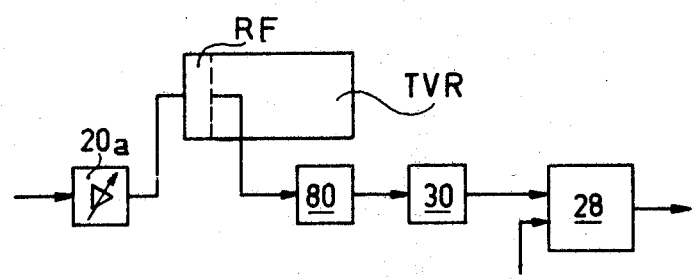
FIG. 8 shows, in a similar manner to FIG. 7, the testing of only the R.F. circuit of the receiver.

When only the R.F. circuits of the receiver TVR are to be tested, the mixer, I.F. section, video detector and video amplifier may be replaced by a simple detector and low pass filter, as before. Thus, the circuit of FIG. 8 is used wherein the circuit block 80 represents the detector and low pass filter.

Figure 9:
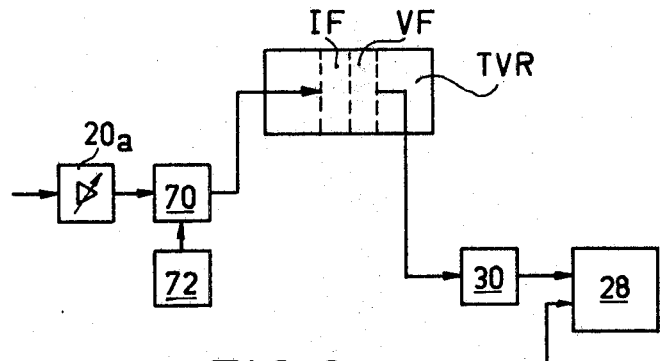
FIG. 9 shows, in a similar manner to FIG. 7, the testing of the I.F. and video circuits of the receiver.

In testing the I.F. and video circuits only, the arrangement of FIG. 9 can be used in which the mixer 70, local oscillator 72 and high impedance probe 30 are arranged as shown. This arrangement is, of course, equivalent to that of FIG. 7 with the detector 22a and low pass filter 24a removed.

It will be appreciated that if the various auxiliary units are constructed, they can be employed in various combinations and arrangements in place of various sections of the circuit under test so that distortions can be traced. These auxiliary circuits can, of course, be checked for phase-linearity by replacing the receiver entirely. As emphasised previously, the test apparatus described is only one of the many which can embody the principles of the present invention. Many others can be devised by those skilled in the art once the general principles are understood. For example, where an instrument is required to test the production of assembled circuits in a factory, in all probability it will not need to be as flexible or as complex as the apparatus shown in FIG. 1. Thus, if video circuits only are to be tested in this way, the oppositely sweeping 10 mc./s. signals can be generated and applied directly to the video circuit and the balanced modulator without the need for a great many of the networks shown in FIG. 1. Various modifications and additions can be made to the phase comparator circuit in order to adapt it for other instruments and other purposes without departing from the principles laid down.

These and many other modifications or alterations can be made without departing from the scope of the present invention.

What is claimed is:

1. A method of analyzing the frequency-phase characteristic of a circuit over a given frequency band comprising the steps of, generating a first signal having a frequency which sweeps in a time-linear manner in one direction over the given frequency band, generating a second signal which sweeps in a time-linear manner in the opposite direction over the given frequency band, applying the first signal to the circuit to be tested, combining the output signal from the circuit under test with the second signal so as to select a signal component of the combination which has a substantially constant frequency that is equal or proportional to the instantaneous sum frequency of the first and second signals, and detecting and indicating the frequency variation in said signal component during the sweep of the first and second signal frequencies.

2. A method as claimed in claim 1 wherein the first signal modulates a carrier signal of a frequency appropriate for application to the circuit being tested.

3. Apparatus for analyzing the frequency-phase characteristic of an electric system over a given frequency band comprising, first signal generating means for generating a first signal having a frequency which sweeps in a time-linear manner in one direction over the given frequency band, second signal generating means for generating a second signal which sweeps in a time-linear manner in the opposite direction over the given frequency band, means applying the first signal to the system to be tested, modulating means for combing the output from the system under test with the second signal so as to select a signal component of the combination which has a substantially constant frequency that is equal or proportional to the instantaneous sum frequency of the first and second signals, and means for detecting and indicating the frequency variation in said signal component during the sweep of the first and second signal frequencies.

4. Apparatus as claimed in claim 3 wherein said modulating means comprises a balanced modulator.

5. Apparatus as claimed in claim 4 further comprising adjustable delay means inserted between the output of said second signal generating means and an input of said modulating means for providing the second signal with a given phase delay over the given frequency band.

6. Apparatus as claimed in claim 3 wherein said means for detecting the frequency variation of the signal component delivered by the modulating means comprises, a phase comparator which compares said incoming signal component with a reference signal, said phase comparator including input means for receiving said signal component and said reference signal and output means, a variable frequency oscillator having input means coupled to said phase comparator output means and controlled at least in part by the output signal of the phase comparator for generating said reference signal, and means for coupling said reference signal to said phase comparator input means.

7. Apparatus for measuring the frequency vs. phase shift characteristic of an electric system comprising, sweep frequency generating means for producing a signal that sweeps linearly over a predetermined frequency band, first and second signal generators for generating first and second different constant frequency signals, respectively, first means for linearly combining the sweep signal of the sweep frequency generating means with the first constant frequency signal of the first signal generator to derive a third signal that sweeps linearly in one direction over a given frequency band, second means for linearly combining the sweep signal of the sweep frequency generating means with the second constant frequency signal of the second signal generator to derive a fourth signal that sweeps linearly in the opposite direction over said given frequency band, means for coupling said third signal to the input of the electric system under test, modulating means for combining the output signal from the system under test with said fourth signal to produce a fifth signal that fluctuates in frequency about a given frequency that is proportional to the sum frequency of said fourth signal and said system output signal, and frequency detection means responsive to said fifth signal for developing a signal that is proportional to the phase delay of the system under test.

8. Apparatus as described in claim 7 further comprising electronic switching means in cascade between the output of said modulating means and the input of said frequency detection means, means for combining said first and second constant frequency signals of said first and second signal generators to produce a calibration signal of a frequency that is approximately equal to said fifth signal given frequency, and means for applying said calibration signal to said electronic switching means, said electronic switching means including means for selectively sampling the calibration signal and the output signal of said modulating means.

9. Apparatus as described in claim 8 further comprising a sawtooth voltage sweep generator having its output coupled to said sweep frequency generating means and to said electronic switching means, an oscilloscope having a pair of input terminals for deflecting the electron beam in mutually perpendicular directions, and means for coupling the output of said sawtooth sweep generator to one of said input terminals and the output of said frequency detection means to the other input terminal of the oscilloscope.

10. Apparatus as described in claim 7 further comprising adjustable delay means in cascade between the output of said second linear combining means and an input of said modulating means to provide a given phase delay to said fourth signal over the given frequency band.

11. Apparatus as described in claim 7 wherein said predetermined frequency band of the sweep frequency generating means extends between the frequencies $f_1$ and $f_2$ and wherein said first and second signal generators generate first and second constant frequency signals $f_1$ and $f_2$, respectively.

12. Apparatus as described in claim 7 wherein said frequency detection means comprises, a phase comparator having one input coupled to the output of said modulating means, a variable frequency oscillator for supplying a variable frequency reference signal to a second input of said phase comparator, and means coupling the output of said phase comparator to an input of said variable frequency oscillator so as to control the frequency thereof as a function of the signal received from said modulating means.

13. Apparatus as claimed in claim 3 further comprising switching means connected in cascade between the output of said modulating means and the input of said detecting means, means for deriving a third signal having a frequency approximately equal to the frequency of said signal component, means for applying said third signal to said switching means, and means for causing said switching means to selectively sample said signal component and said third signal.

References Cited

UNITED STATES PATENTS

| | | |
|---|---|---|
| 3,059,187 | 10/1962 | Jaffe. |
| 3,348,139 | 10/1967 | Ranky. |
| 2,970,258 | 1/1961 | Sinclair _____ 324—57 |
| 2,971,152 | 2/1961 | Ranky _____ 324—57 |
| 3,032,712 | 5/1962 | Hurvitz _____ 324—57 |
| 3,182,254 | 5/1965 | Feldman et al. |
| 3,265,967 | 8/1966 | Heald _____ 324—58 X |
| 3,364,426 | 1/1968 | Hurvitz. |

EDWARD E. KUBASIEWICZ, Primary Examiner

U.S. Cl. X.R.

324—82